(12) United States Patent
Suzuki

(10) Patent No.: US 11,256,451 B2
(45) Date of Patent: Feb. 22, 2022

(54) SERVER, FUNCTION EXECUTING DEVICE, NON-TRANSITORY COMPUTER-READABLE RECORDING MEDIUM STORING COMPUTER READABLE INSTRUCTIONS FOR SERVER AND FUNCTION EXECUTING DEVICE

(71) Applicant: BROTHER KOGYO KABUSHIKI KAISHA, Nagoya (JP)

(72) Inventor: Satoshi Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/147,603

(22) Filed: Jan. 13, 2021

(65) Prior Publication Data

US 2021/0216251 A1 Jul. 15, 2021

(30) Foreign Application Priority Data

Jan. 15, 2020 (JP) .............................. JP2020-004585

(51) Int. Cl.
*G06F 15/00* (2006.01)
*G06F 3/12* (2006.01)
*G06K 1/00* (2006.01)
*H04L 12/28* (2006.01)
*H04L 67/02* (2022.01)

(52) U.S. Cl.
CPC ............ *G06F 3/1205* (2013.01); *G06F 3/129* (2013.01); *G06F 3/1231* (2013.01); *G06F 3/1238* (2013.01); *G06F 3/1286* (2013.01); *H04L 12/28* (2013.01); *H04L 67/02* (2013.01)

(58) Field of Classification Search
CPC .................................. H04L 12/28; H04L 67/02
USPC .............................. 358/1.1, 1.15, 1.13, 1.14
See application file for complete search history.

(56) References Cited

U.S. PATENT DOCUMENTS

| | | | |
|---|---|---|---|
| 2003/0033451 A1 | 2/2003 | Yoshida et al. | |
| 2004/0263870 A1* | 12/2004 | Itoh ...................... | G06F 3/1236 358/1.1 |
| 2007/0043805 A1* | 2/2007 | Izaki ...................... | G06F 3/121 709/201 |
| 2008/0250277 A1 | 10/2008 | Yoshida et al. | |
| 2012/0166564 A1 | 6/2012 | Yoshida et al. | |
| 2012/0194864 A1 | 8/2012 | Oshima et al. | |

(Continued)

FOREIGN PATENT DOCUMENTS

| | | |
|---|---|---|
| JP | 2006-331436 A | 12/2006 |
| JP | 2012-159914 A | 8/2012 |

*Primary Examiner* — Douglas Q Tran
(74) *Attorney, Agent, or Firm* — Scully, Scott, Murphy & Presser, PC

(57) ABSTRACT

A server disclosed herein may include a controller configured to: receive a location information request for requesting sending of location information from a function executing device; receive a first screen request including the location information from a first terminal device that has obtained the location information; send screen data representing the setting change screen to the first terminal device; receive a change request for requesting a change of the setting information from the first terminal device; and in a case where the change request is received from the first terminal device, change the setting information in the memory according to the change request.

16 Claims, 10 Drawing Sheets

(56) References Cited

U.S. PATENT DOCUMENTS

| | | |
|---|---|---|
| 2012/0240029 A1* | 9/2012 | Sugaya ................ G06F 3/1203 715/234 |
| 2014/0068355 A1 | 3/2014 | Yoshida et al. |
| 2015/0124293 A1 | 5/2015 | Oshima et al. |
| 2017/0024172 A1 | 1/2017 | Oshima et al. |
| 2018/0046534 A1 | 2/2018 | Yoshida et al. |

* cited by examiner

SERVER, FUNCTION EXECUTING DEVICE, NON-TRANSITORY COMPUTER-READABLE RECORDING MEDIUM STORING COMPUTER READABLE INSTRUCTIONS FOR SERVER AND FUNCTION EXECUTING DEVICE

CROSS-REFERENCE TO RELATED APPLICATION

This application claims priority to Japanese Patent Application No. 2020-004585, filed on Jan. 15, 2020, the entire contents of which are incorporated herein by reference.

TECHNICAL FIELD

The present disclosure discloses a technique related to a server and a function executing device.

BACKGROUND

A technique to register a printer in a server is known. When the printer is registered in the server, registration information including a Uniform Resource Locator (URL) of an administration webpage of the printer is sent to the printer, and this registration information is sent from the printer to an administrator terminal.

SUMMARY

The above technique does not consider a situation in which setting information of the printer registered in the server is to be changed after the printer has been registered in the server. The disclosure herein provides art that enables a user to change setting information which is stored in a server and related to a function which a function executing device is configured to execute.

A server disclosed herein may comprise: a memory configured to store setting information related to a function that a function executing device is configured to execute; and a controller, wherein the controller is configured to: receive a function executing request from an external device, the function executing request being for causing the function executing device to execute the function; in a case where the function executing request is received from the external device, execute a relation process using the setting information in the memory, the relation process being related to causing the function executing device to execute the function; receive a location information request for requesting sending of location information from the function executing device, the location information indicating a location corresponding to a setting change screen for changing the setting information; in a case where the location information request is received from the function executing device, send the location information to the function executing device, wherein the location information is outputted by the function executing device in response to the location information being sent to the function executing device; receive a first screen request including the location information from a first terminal device that has obtained the location information outputted by the function executing device; in a case where the first screen request is received from the first terminal device, send screen data representing the setting change screen to the first terminal device, wherein the setting change screen is displayed on the first terminal device in response to the screen data being sent to the first terminal device; in a case where an instruction for changing the setting information is given on the setting change screen, receive a change request for requesting a change of the setting information from the first terminal device; and in a case where the change request is received from the first terminal device, change the setting information in the memory according to the change request.

Further, a function executing device disclosed herein may comprise: a function executing engine configured to execute a function; and a controller, wherein the controller is configured to: receive a function executing instruction from a server; in a case where the function executing instruction is received from the server, cause the function executing engine to execute the function; accept a reception instruction for receiving location information, the location information being information indicating a location corresponding to a setting change screen for changing setting information related to the function, the setting information being stored in the server; in a case where the reception instruction is accepted, send a location information request for requesting sending of the location information to the server; in a case where the location information request is sent to the server, receive the location information from the server; and in a case where the location information is received from the server, execute an output process for externally outputting the location information.

A control method, a computer program and a non-transitory computer-readable medium storing computer readable instructions for realizing the aforementioned server are also novel and useful. A control method, a computer program and a non-transitory computer-readable medium storing computer readable instructions for realizing the aforementioned function executing device are also novel and useful. Moreover, a communication system comprising the above server and function executing device is also novel and useful.

Figure 1:
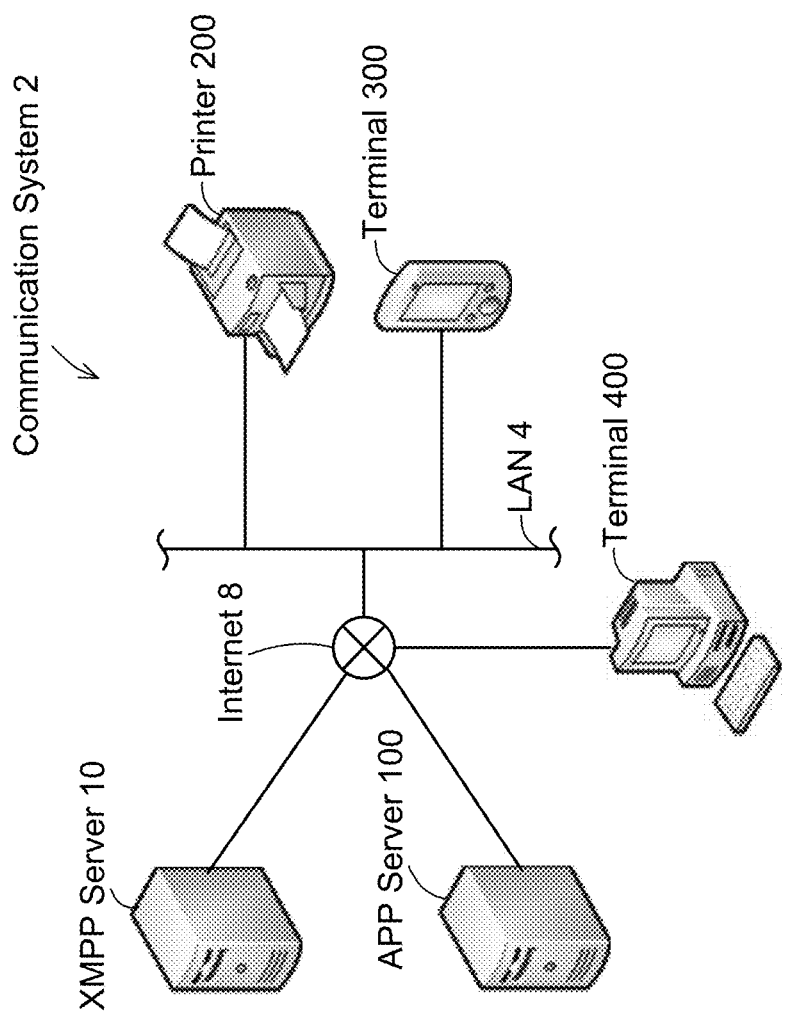
FIG. 1 shows a configuration of a communication system.

DETAILED DESCRIPTION (Configuration of Communication System 2; FIG. 1)

As shown in FIG. 1, a communication system 2 is provided with an eXtensible Messaging and Presence Protocol (XMPP) server 10, an application (APP) server 100, a printer 200, and a plurality of terminals 300, 400.

In an example of FIG. 1, the printer 200 and the terminal 300 are connected to a Local Area Network (LAN) 4. The printer 200 and the terminal 300 are configured to communicate with each other via the LAN 4. The LAN 4 may be a wired LAN or a wireless LAN. The XMPP server 10, the APP server 100, and the terminal 400 are connected to the Internet 8. The devices 10, 100, 200, 300, 400 are configured to communicate with each other via the Internet 8.

Figure 2:
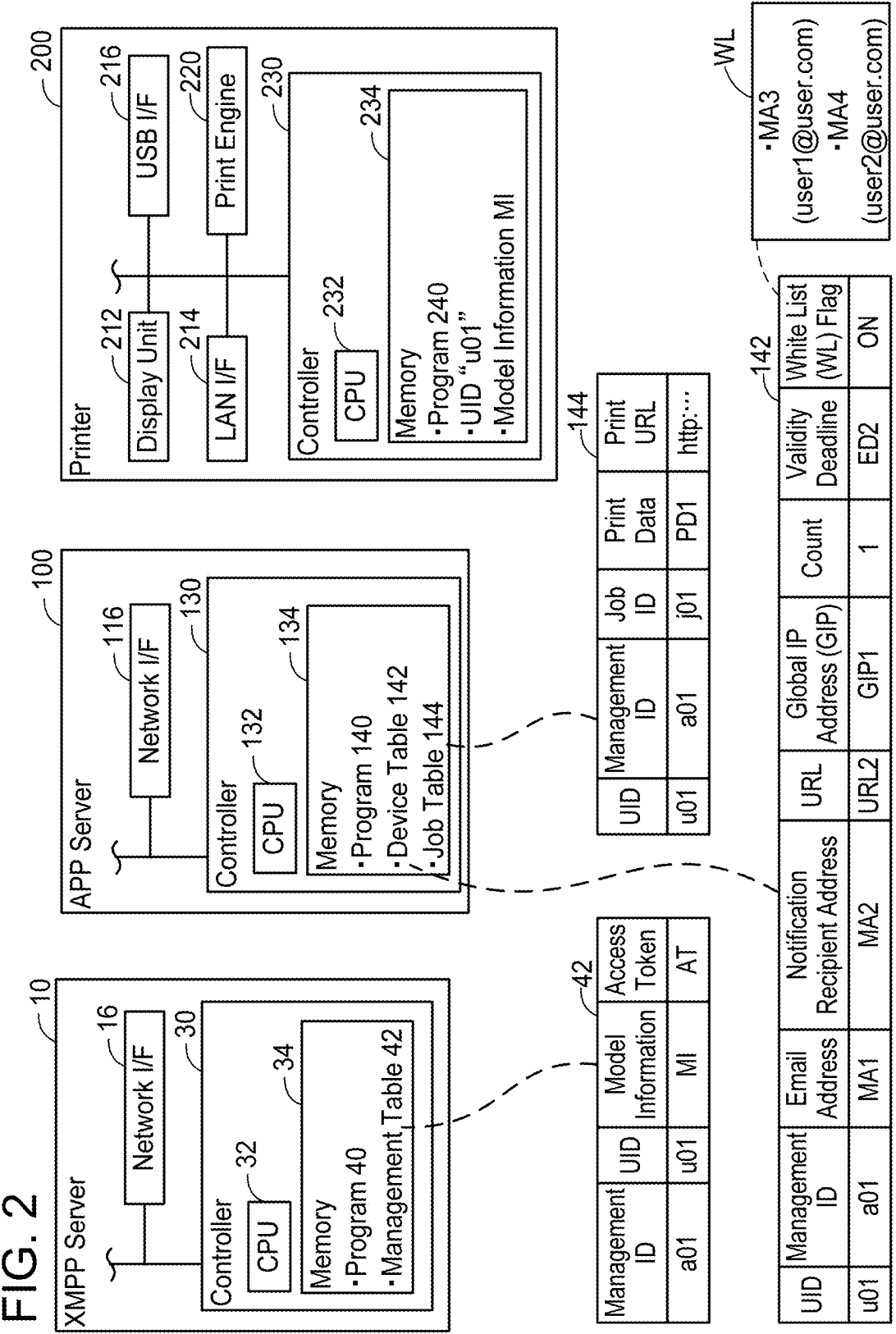
FIG. 2 is a block diagram showing configurations of respective devices.

(Configuration of XMPP Server 10; FIG. 2)

Configurations of the respective devices 10, 100, 200 will be described in order with reference to FIG. 2. The XMPP server 10 is provided on the Internet 8 by a vendor of the printer 200 or the like. The XMPP server 10 is a server for establishing an XMPP session with a printer (such as the printer 200). The XMPP session is a communication session of a so-called full-time connection. By using the XMPP session, the XMPP server 10 can send requests to the printer over a firewall of a LAN to which the printer belongs without receiving requests from the printer.

The XMPP server 10 is provided with a network interface 16 and a controller 30. The respective units 16, 30 are connected to a bus line (reference sign omitted). Hereinbelow, an interface will be denoted "I/F". The network I/F 16 is connected to the Internet 8 (see FIG. 1). The controller 30 is provided with a CPU 32 and a memory 34. The CPU 32 is configured to execute various processes according to a program 40 stored in the memory 34. The memory 34 is configured of a volatile memory, a nonvolatile memory, and the like. The memory 34 stores a management table 42 as well as the program 40 as above.

The management table 42 is a table in which information related to a printer is stored. The management table 42 stores, for each of a plurality of printers, a management Identifier (ID), a unique ID (UID), model information, and an access token in association with each other. The management ID is identification information that is for managing the printer and is generated by the XMPP server 10. The UID is identification information that is for identifying the printer and is preassigned to the printer. The model information indicates information related to a model (e.g., model name, spec) of the printer. The access token is authentication information for establishing an XMPP session with the printer.

(Configuration of APP Server 100)

The APP server 100 is provided on the Internet 8 by a vendor of the printer 200 or the like. The APP server 100 is a server for executing communication for email print with a printer (such as the printer 200). The email print is a function for causing a printer to print an image represented by image data included in an email.

The APP server 100 is provided with a network interface 116 and a controller 130. The respective units 116, 130 are connected to a bus line (reference sign omitted). The network I/F 116 is connected to the Internet 8 (see FIG. 1). The controller 130 is provided with a CPU 132 and a memory 134. The CPU 132 is configured to execute various processes according to a program 140 stored in the memory 134. The memory 134 stores a device table 142 and a job table 144 as well as the program 140 as above.

The device table 142 is a table in which information related to a printer is registered. The device table 142 stores, for each of a plurality of printers, a UID, a management ID, an email address, a notification recipient address, a Uniform Resource Locator (URL), a global IP address (hereinbelow termed "GIP"), a count, a validity deadline, and a white list (hereinbelow termed "WL") flag in association with each other.

The email address is an email address that is assigned to the printer for realizing the email print and is generated by the APP server 100. A user can change the email address generated by the APP server 100. In this case, an email address designated by the user is registered in the device table 142. The notification recipient address is an email address of a recipient of notification information. The notification information is information for notifying that a setting change screen request for changing a setting related to the email print (hereinbelow termed "email print setting") was received from an improper terminal. The URL is location information indicating a location corresponding to a setting change screen. The GIP is an IP address of a sender of the setting change screen request as above. The count indicates the number of times the setting change screen request was received. The WL flag is a flag indicating whether to execute authentication of a sender of an email for the email print or not, and indicates one of "ON" indicating that the authentication is to be executed and "OFF" indicating that the authentication is not to be executed. In a case where the WL flag indicates "ON", a WL is further registered in the device table 142 in association with the WL flag. An email address of a terminal that is allowed to execute the email print is registered in the WL.

The job table 144 is a table in which information related to a print job is registered. The job table 144 stores a UID, a management ID, a job ID, print data, and a print URL in association with each other. The job ID is identification information that identifies a print job. The print data is data representing a target image of printing to be executed according to the print job. The print URL is location information indicating a location of the print data.

(Configuration of Printer 200)

The printer 200 is a peripheral device configured to execute a print function (i.e., a peripheral device of the terminal 300 connected to the LAN 4). The printer 200 includes a display unit 212, a LAN I/F 214, a Universal Serial Bus (USB) I/F 216, a print engine 220, and a controller 230. The respective units 212 to 230 are connected to a bus line (reference sign omitted). The display unit 212 is a display for displaying various types of information. The display unit 212 is a so-called touch screen and functions as an operation unit as well. The LAN I/F 214 is connected to the LAN 4 (see FIG. 1). The USB I/F 216 is an I/F to which a USB cable is to be connected. In the example of FIG. 1, the printer 200 and the terminal 300 are configured to communicate with each other via the LAN 4, however, in an example that is not shown, the printer 200 and the terminal 300 are configured to communicate with each other via the USB cable. The print engine 220 is provided with a printing mechanism of an inkjet scheme, a laser scheme, or the like.

The controller 230 is provided with a CPU 232 and a memory 234. The CPU 232 is configured to execute various processes according to a program 240 stored in the memory 234. The memory 234 further stores a UID "u01" of the printer 200 and model information MI of the printer 200.

Figure 3:
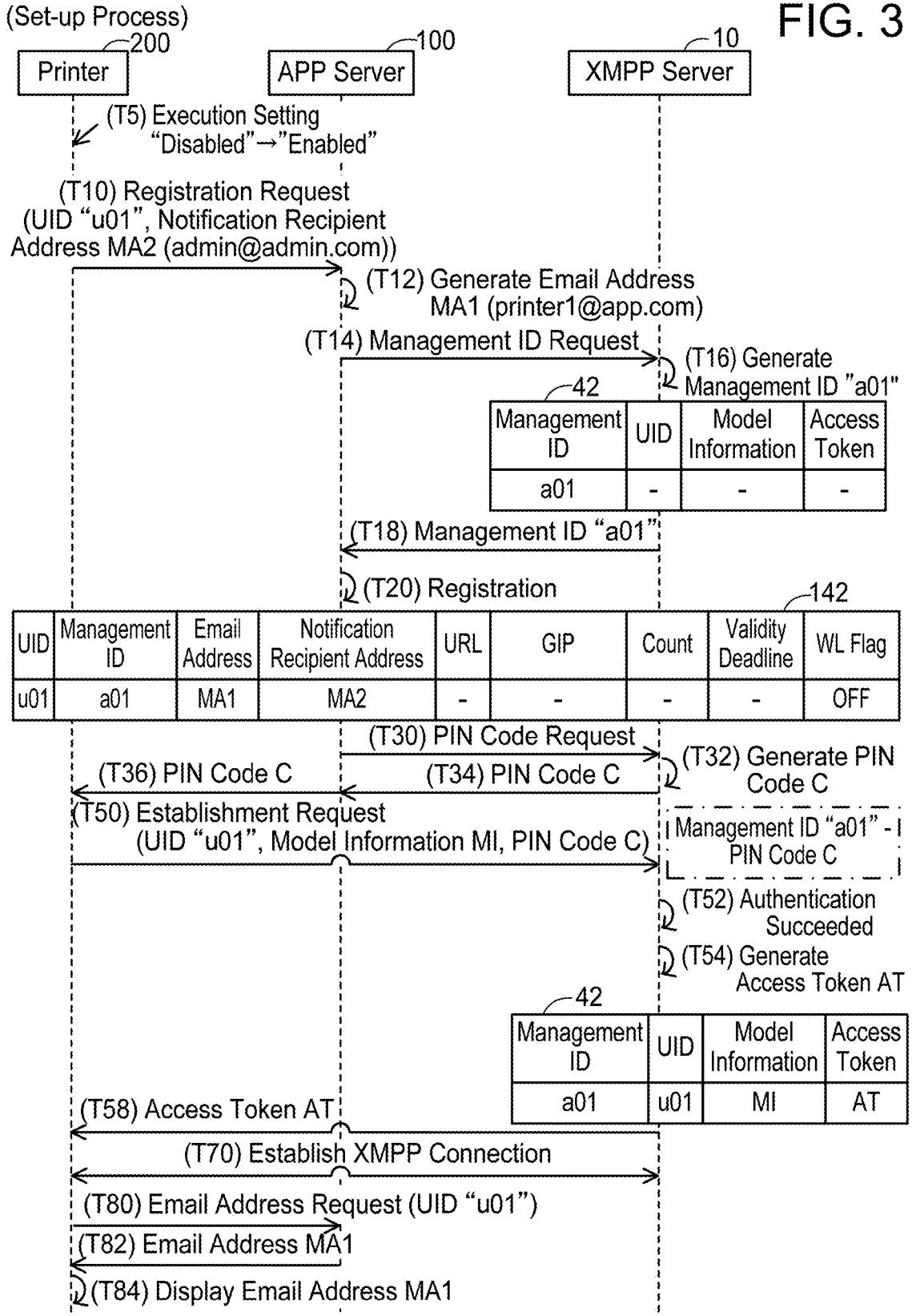
FIG. 3 is a sequence diagram of a setup process.

(Setup Process; FIG. 3)

Next, a setup process to be executed in advance for realizing the email print will be described with reference to FIG. 3. For description of the process of FIG. 3, for facilitation of understanding, processes executed by the respective CPUs of the devices (such as the CPU 32 of the XMPP server 10) will be described with the devices (such as the XMPP server 10) themselves as the subject of action instead of describing those processes with the respective CPUs as the subject of action. Further, all of the communication in FIG. 3 is executed via the LAN 4 or the Internet 8. Due to this, hereinbelow, the phrases "via the LAN 4" and "via the Internet 8" will be omitted.

In T5, the printer 200 accepts an operation for changing an execution setting from "disabled" to "enabled" from the user. The execution setting is a setting related to whether or not the execution of the email print is allowed, and indicates a value which is one of "disabled" meaning that the email print is not to be executed and "enabled" meaning that the email print is to be executed. The execution setting indicates "disabled" by default.

When the execution setting is changed from "disabled" to "enabled" in T5, the printer 200 sends to the APP server 100 a registration request requesting registration of information used in communication of the email print in T10. The registration request includes the UID "u01" and a notification recipient address MA2. In the present embodiment, the notification recipient address MA2 is an email address of an administrator of the printer 200, and is preset in the printer 200 by the administrator.

When receiving the registration request from the printer 200 in T10, the APP server 100 generates an email address MA1 for causing the printer 200 to execute the email print in T12. The email address MA1 includes a local part "printer1" and a domain name "app.com" of the APP server 100. Then, in T14, the APP server 100 sends to the XMPP server 10 a management ID request that requests the XMPP server 10 to generate and send a management ID.

In a case of receiving the management ID request from the APP server 100 in T14, the XMPP server 10 generates a management ID "a01" and stores the management ID "a01" in the management table 42 in T16. Then, in T18, the XMPP server 10 sends the management ID "a01" to the APP server 100.

When receiving the management ID "a01" from the XMPP server 10 in T18, the APP server 100 stores in T20 the UID "u01" in the registration request of T10, the management ID "a01" of T18, the email address MA1 of T12, and the notification recipient address MA2 in the registration request of T10 in the device table 142 in association with each other. At this time point, the URL, the GIP, the count, and the validity deadline are blank, and the WL flag indicates OFF. Next in T30, the APP server 100 sends to the XMPP server 10 a Personal Identification Number (PIN) code request that requests the XMPP server 10 to generate and send of a PIN code.

When receiving the PIN code request from the APP server 100 in T30, the XMPP server 10 generates a PIN code C and stores the management ID "a01" and the PIN code C in the memory 34 in association with each other in T32. Then, in T34, the XMPP server 10 sends the PIN code C to the APP server 100.

When receiving the PIN code C from the XMPP server 10 in T34, the APP server 100 sends the PIN code C to the printer 200 in T36.

When receiving the PIN code C from the APP server 100 in T36, the printer 200 sends in T50 an establishment request that requests establishment of an XMPP session to the XMPP server 10. The establishment request includes the UID "u01", the model information MI, and the PIN code C.

When receiving the establishment request from the printer 200 in T50, the XMPP server 10 executes authentication of the PIN code C in the establishment request in T52. In the present case, since the PIN code C in the establishment request matches the PIN code C stored in T32, the authentication of the PIN code C succeeds. In this case, the XMPP server 10 executes processes from TM. If the authentication of the PIN code C fails, the XMPP server 10 does not execute the processes from TM.

In TM, the XMPP server 10 generates an access token AT. Then, the XMPP server 10 identifies the management ID "a01" (see T32) stored in association with the PIN code C from the memory 34. Then, the XMPP server 10 stores in the management table 42 the UID "u01" and the model information MI in the establishment request of T50 and the generated access token AT in association with the identified management ID "a01". After this, in T58, the XMPP server 10 sends the access token AT to the printer 200.

When receiving the access token AT from the XMPP server 10 in T58, the printer 200 uses the access token AT to establish an XMPP session with the XMPP server 10 in T70. Then, in T80, the printer 200 sends to the APP server 100 an email address request that requests sending of an email address. The email address request includes the UID "u01".

When receiving the email address request from the printer 200 in T80, the APP server 100 sends in T82 the email address MA1 (see T20) stored in association with the UID "u01" in the email address request to the printer 200.

When receiving the email address MA1 from the APP server 100 in T82, the printer 200 causes the display unit 212 to display the email address MA1 in T84. Due to this, the user can acknowledge the email address MA1.

Figure 4:
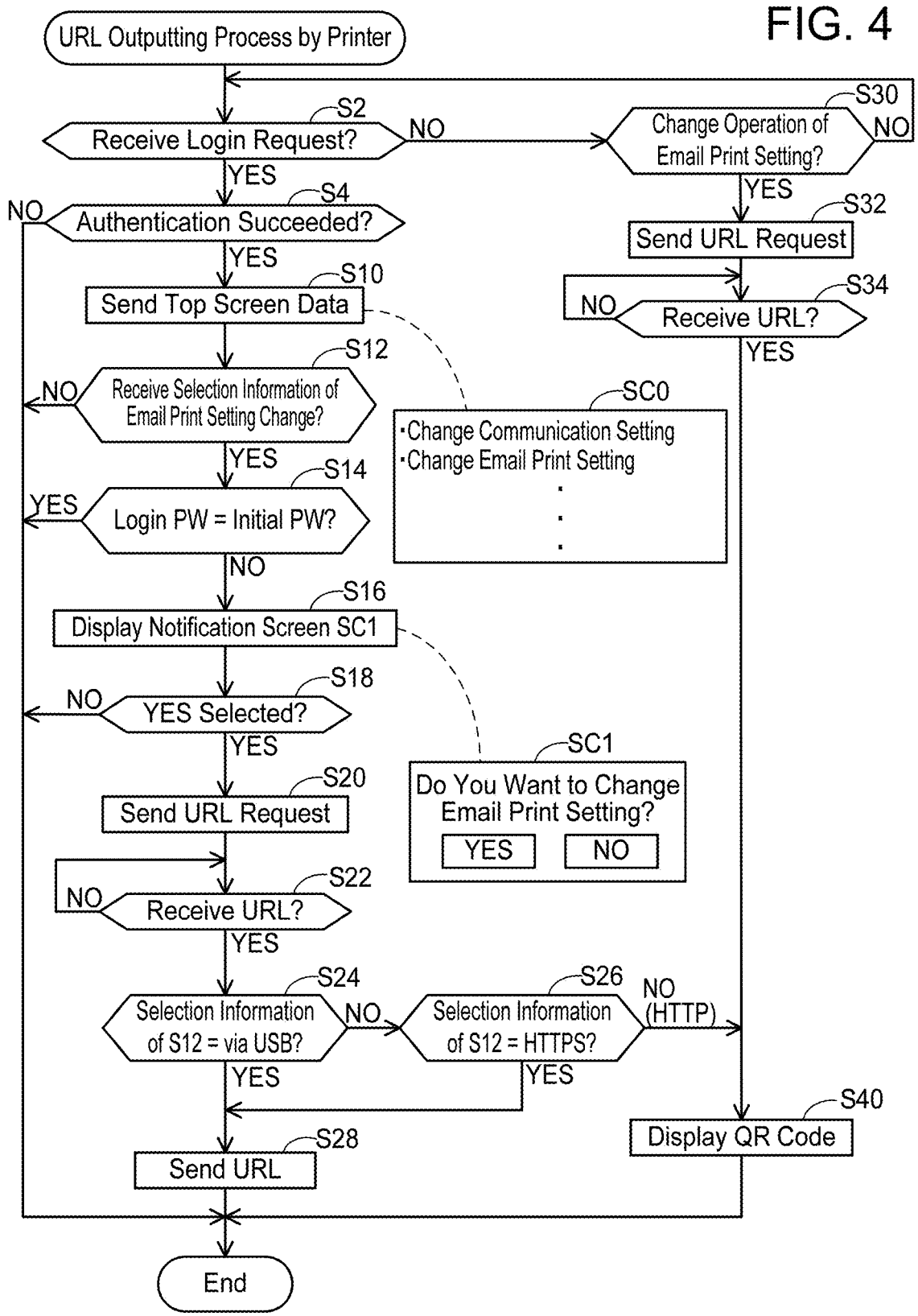
FIG. 4 is a flowchart of a URL output process which a printer executes.

(URL Output Process by Printer; FIG. 4)

Next, a URL output process executed by the CPU 232 of the printer 200 will be described with reference to FIG. 4. The URL output process is a process of outputting a URL indicating a location of a setting change screen for changing the email print setting registered in the APP server 100. In the present embodiment, the setting change screen is a screen for changing the WL flag, designating an email address to be registered in the WL.

In S2, the CPU 232 monitors receipt of a login request from the terminal 300. In the present embodiment, the printer 200 can function as a web server, and the login request is a request for logging into the web server in the printer 200. In a case of receiving a login request including a user ID and a login password (hereinafter simply termed "PW") from the terminal 300 via the LAN I/F 214 or the USB I/F 216, the CPU 232 determines YES in S2 and proceeds to S4. Here, the login request is communicated according to one of Hyper Text Transfer Protocol (HTTP) and HTTP Secure (HTTPS). In a variant, the printer 200 may execute user authentication by using only a login PW without using a user ID. In this case, the login request may include a login PW but not a user ID.

In S4, the CPU 232 executes the authentication of the user ID and the login PW included in the login request and determines whether this authentication succeeded. Specifically, the printer 200 stores in advance user IDs and login PWs that can be used to access the web server in the printer 200. The CPU 232 determines that the authentication succeeded (YES in S4) in a case where the user ID and the login PW included in the login request respectively match one of the stored user IDs and one of the login PWs, and proceeds to S10. On the other hand, in a case where the authentication failed (NO in S4), the CPU 232 terminates the process of FIG. 4 without executing processes from S10.

In S10, the CPU 232 sends top screen data to the terminal 300. Here, the CPU 232 sends the top screen data in S10 via the LAN I/F 214 in a case of having received the login request via the LAN I/F 214 in S2. On the other hand, the CPU 232 sends the top screen data in S10 via the USB I/F 216 in a case of having received the login request in S2 via the USB I/F 216. Further, the CPU 232 sends the top screen data in S10 in accordance with the HTTP in a case of having received the login request in S2 in accordance with the HTTP. On the other hand, the CPU 232 sends the top screen data in S10 in accordance with the HTTPS in a case of having received the login request in S2 in accordance with the HTTPS. In S12 and S28 to be described later as well, communication is executed via the I/F (i.e., 214 or 216) used for receiving the login request in S2 and according to the protocol (i.e., HTTP or HTTPS) used in receiving the login request in S2.

When the top screen data is sent to the terminal 300, a top screen SC0 represented by the top screen data is displayed on the terminal 300. The top screen SC0 includes a plurality of buttons including a communication setting change button (i.e., a character string "change communication settings") for changing communication setting of the printer 200 (such as the IP address and a gateway address) and an email print setting change button (i.e., a character string "change email print setting") for changing the email print setting. When one of the buttons is selected in the top screen SC0, selection information indicating that this button was selected is sent to the printer 200.

In S12, the CPU 232 determines whether or not the selection information indicating that the email print setting change button was selected is received from the terminal 300. The CPU 232 determines YES in S12 in a case of having received this selection information and proceeds to S14. In this case, the CPU 232 stores in the memory 234 information indicating whether this selection information was received via the LAN I/F 214 or via the USB I/F 216. The CPU 232 further stores in the memory 234 whether this selection information was received according to the HTTP or according to the HTTPS. On the other hand, the CPU 232 determines NO in S12 in a case of having received selection information indicating that a button different from the email print setting change button was selected, and executes a process according to this selection information. In this case, the process of FIG. 4 is terminated without processes from S14 being executed.

In S14, the CPU 232 determines whether or not the login PW included in the login request is an initial PW. Here, the initial PW is a predetermined default PW and was stored in the printer 200 in advance before the printer 200 was shipped. The user can change the initial PW to any PW by operating the printer 200 or logging into the web server in the printer 200. Before the initial PW is changed, the login PW included in the login request is the initial PW. On the other hand, after the initial PW has been changed, the login PW included in the login request is a PW different from the initial PW. The CPU 232 determines NO in S14 in a case where the login PW is not the initial PW and proceeds to S16. On the other hand, the CPU 232 determines YES in S14 in a case where the login PW is the initial PW, and terminates the process of FIG. 4 without executing processes from S16.

As described above, the initial PW was stored in the printer 200 in advance before the printer 200 was shipped, and is described for example in a manual of the printer 200. As such, a third party different from the user of the printer 200 may know the initial PW. In other words, security of the initial PW is low. Due to this, the CPU 232 does not execute the processes from S16 in the case where the login PW included in the login request is the initial PW (YES in S14). As a result, the email print setting can be prevented from being changed by the third party.

In S16, the CPU 232 causes the display unit 212 to display a notification screen SC1. The notification screen SC1 includes a message inquiring of the user whether to change the email print setting, a YES button, and a NO button.

In S18, the CPU 232 determines whether or not the YES button in the notification screen SC1 was selected. The CPU 232 determines YES in S18 in a case where the YES button was selected, and proceeds to S20. On the other hand, the CPU 232 determines NO in S18 in a case where the NO button in the notification screen SC1 was selected, and terminates the process of FIG. 4 without executing processes from S20.

As above, the printer 200 displays the notification screen SC1 and executes the processes from S20 in the case where the YES button was selected (YES in S18), while it does not execute the processes from S20 in the case where the YES button was not selected (NO in S18). That is, the printer 200 executes the processes from S20 for a legitimate user who can directly operate the printer 200, while it does not execute the processes from S20 for a third party who cannot directly operate the printer 200. This can prevent the email print setting from being changed by the third party.

In S20, the CPU 232 sends a URL request including the UID "u01" of the printer 200 to the APP server 100 via the LAN I/F 214. The URL request is a signal for requesting sending of a URL indicating a location of the setting change screen for changing the email print setting.

In S22, the CPU 232 monitors receipt of the URL from the APP server 100 via the LAN I/F 214. The CPU 232 determines YES in S22 in a case of receiving the URL from the APP server 100, and proceeds to S24.

In S24, the CPU 232 determines whether or not the selection information of S12 was received via the USB I/F 216. As described above, the memory 234 already stores in S12 the information indicating whether the selection information was received via the LAN I/F 214 or via the USB I/F 216. The CPU 232 determines YES in S24 in a case where this information indicates that the selection information was received via the USB I/F 216 and proceeds to S28. On the other hand, the CPU 232 determines NO in S24 in a case where this information indicates that the selection information was received via the LAN I/F 214 and proceeds to S26.

In S26, the CPU 232 determines whether or not the selection information of S12 was received according to the HTTPS. As described above, the memory 234 already stores in S12 the information indicating whether the selection information was received according to the HTTP or the selection information was received according to the HTTPS. The CPU 232 determines YES in S26 in a case where this information indicates that the selection information was received according to the HTTPS and proceeds to S28. On the other hand, the CPU 232 determines NO in S26 in a case where this information indicates that the selection information was received according to the HTTP and proceeds to S40.

In S28, the CPU 232 sends the URL received in S22 to the terminal 300. Due to this, the terminal 300 can display the setting change screen using this URL, and the user can change the email print setting by using the setting change screen. When S28 is completed, the process of FIG. 4 is terminated.

In S40, the CPU 232 causes the display unit 212 to display a QR Code (registered trademark). This QR Code is a coded image in which the URL received in S22 is coded. Due to this, the user can cause the terminal 300 to obtain the URL by causing the terminal 300 to capture an image of the QR Code. In this case, the terminal 300 can display the setting change screen by using this URL, and the user can change the email print setting by using the setting change screen. When S40 is completed, the process of FIG. 4 is terminated.

As above, in the case where the selection information was received according to the HTTPS (YES in S26), the printer 200 sends the URL to the terminal 300 via the LAN I/F 214. The HTTPS is a protocol for executing securer communication compared to the HTTP. Due to this, in the case where the URL is communicated according to the HTTPS, the URL is unlikely to be obtained by a third party in the course of communication of the URL. Thus, the email print setting can be prevented from being changed by the third party. Further, since the URL is sent to the terminal 300, the user can cause the terminal 300 to display the setting change screen without performing an operation for the terminal 300 to obtain the URL (such as an operation of capturing an image of the QR Code). As such, user convenience is improved. On the other hand, the printer 200 does not send the URL to the terminal 300 via the LAN I/F 214 in the case where the selection information was received according to the HTTP (NO in S26). This is because the URL could be obtained by the third party in the course of communication of the URL. Since the URL is not sent to the terminal 300, the email print setting can be prevented from being changed by the third party.

In the case where the selection information was received according to the HTTP (NO in S26), the printer 200 displays the QR Code in which the URL is coded. The legitimate user who can approach the printer 200 can cause the terminal 300 to obtain the QR Code. On the other hand, a third party who cannot approach the printer 200 cannot cause the terminal 300 to obtain the QR Code. This can prevent the email print setting from being changed by the third party.

In the case where the selection information was received via the USB I/F 216 (YES in S24), the printer 200 sends the URL to the terminal 300 via the USB I/F 216 regardless of which protocol was used to receive the selection information. This is because the communication executed via the USB I/F 216 is unlikely to be intercepted by a third party even if it is in accordance with the HTTP. Since the URL is sent to the terminal 300, the user convenience is improved.

In parallel to the monitoring process of S2, the CPU 232 monitors acceptance of the change operation for the email print setting from the user in S30. The CPU 232 determines YES in S30 in a case of accepting this operation from the user and proceeds to S32.

Processes of S32 and S34 are similar to the processes of S20 and S22, respectively. When S34 is completed, the CPU 232 causes the display unit 212 to display the QR Code in which the URL is coded in S40. Thus, the user of the terminal 300 can cause the terminal 300 to obtain the URL by capturing the image of the QR Code, and thereby can change the email print setting by using the setting change screen.

Figure 5:
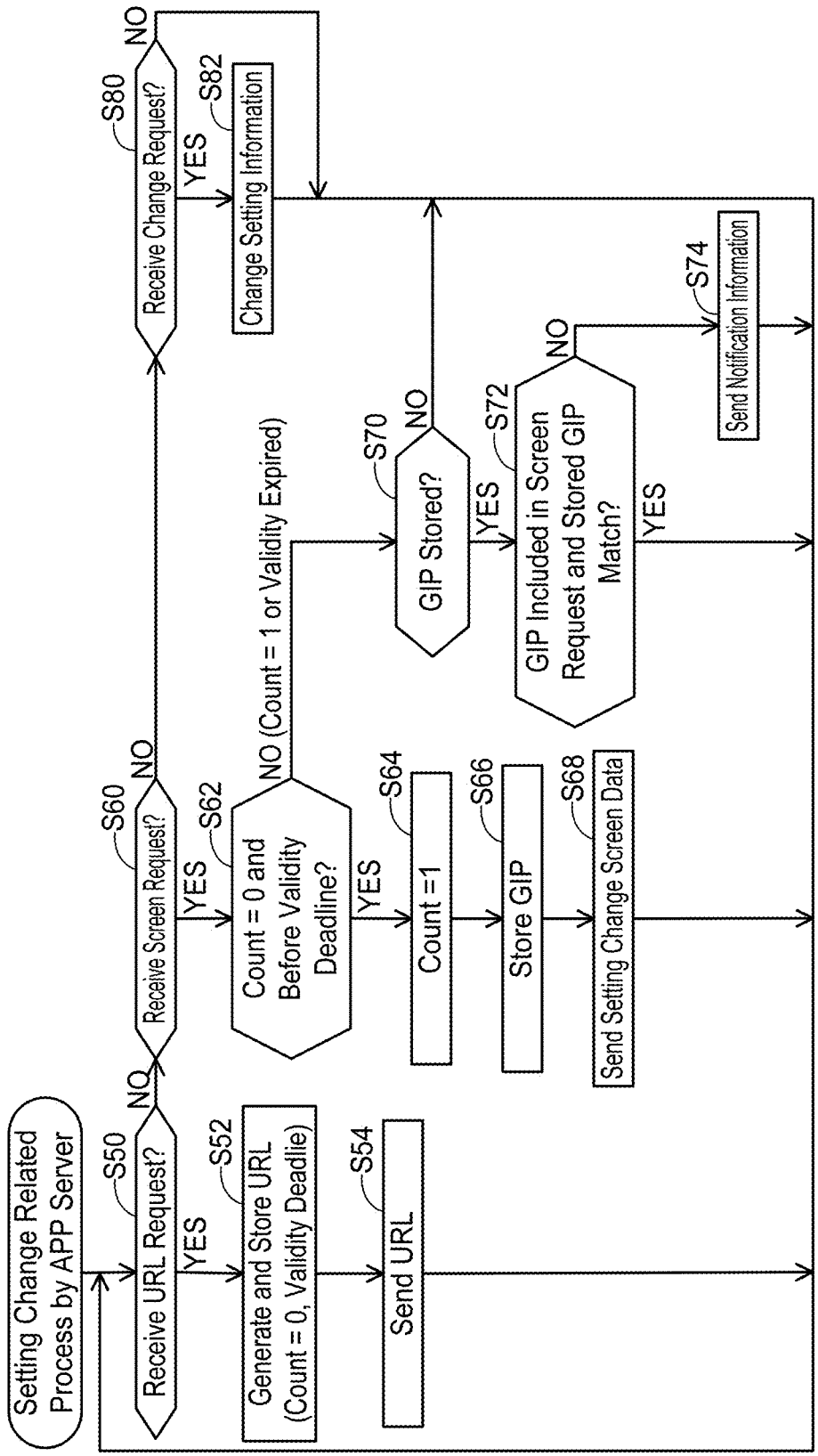
FIG. 5 is a flowchart of a setting change related process executed by an APP server.

(Setting Change-Related Process by APP Server 100; FIG. 5)

Next, a setting change-related process executed by the CPU 132 of the APP server 100 will be described with reference to FIG. 5. The setting change-related process is a process related to changing the email print setting.

In S50, S60, and S80, the CPU 132 monitors receipt of various requests. The CPU 132 determines YES in S50 in a case of receiving the URL request (see S20 of FIG. 4) from a printer (such as 200) via the network I/F 116 and proceeds to S52. Hereinafter, processes from S52 will be described assuming that the URL request of S50 is received from the printer 200, as an example.

In S52, the CPU 132 generates and stores a URL. Specifically, the CPU 132 generates a unique URL each time the URL request is received from the printer 200. More specifically, the CPU 132 generates a URL that includes a character string indicating a current date and time. Then, the CPU 132 stores in the device table 142 this URL, "0" as a value of the count, and a validity deadline in association with the UID "u01" included in the URL request. The validity deadline is information indicating a date and time determined by adding a predetermined time to the date and time when the URL was generated.

In S54, the CPU 132 sends the URL generated in S52 to the printer 200 via the network I/F 116. When the process of S54 is completed, the CPU 132 returns to the monitoring such as S50.

As above, the APP server 100 generates a unique URL (S52) each time the URL request is received from the printer 200, and sends this URL to the printer 200 (S54). That is, the security of the URL can be increased. As such, the email print setting can be prevented from being changed by the third party.

Further, in a case of receiving a screen request including a URL from a terminal (such as 300, 400) via the network I/F 116, the CPU 132 determines YES in S60 and proceeds to S62. The screen request is a signal that requests sending of setting change screen data representing the setting change screen, and includes a URL and a GIP. Here, this URL is the URL sent to the printer 200 in S54, and the GIP is a GIP of a sender included in the screen request (such as a GIP assigned to the terminal 300 or a GIP assigned to the LAN to which the terminal 300 belongs). Hereinbelow, a sender terminal of the screen request will be termed "target terminal", and the URL and the GIP included in the screen request will respectively be termed "target URL" and "target GIP".

In S62, the CPU 132 checks the count and the validity deadline (see the device table 142 of FIG. 2) associated with the target URL. Specifically, the CPU 132 determines whether or not the value of the count associated with the target URL is 0. Along with this, the CPU 132 compares the validity deadline associated with the target URL with a current time to determine whether or not the current time has passed the valid deadline. In other words, the CPU 132 determines whether or not the current time is on or before the validity deadline of the target URL. The CPU 132 determines YES in S62 in a case of determining that the value of the count associated with the target URL is 0 and the current time is on or before the validity deadline, and proceeds to S64. On the other hand, the CPU 132 determines NO in S62 in a case of determining that the value of the count associated with the target URL is not 0 or determining that the current time is after the validity deadline, and proceeds to S70.

As above, processes of S64 to S68 are not executed in a case where the value of the count associated with the target URL is 1, as a result of which the setting change screen data is not sent. That is, the target URL being the URL of the setting change screen data is a so-called one-time URL, and its security is high. Thus, the email print setting can be prevented from being changed by a third party. Further, the processes of S64 to S68 are not executed in a case where the current time has passed the validity deadline of the target URL, as a result of which the setting change screen data is not sent. Due to this, even if the target URL is obtained by the third party, a possibility that the setting change screen data is not sent due to the target URL having passed the validity deadline can be increased. As such, the email print setting can be prevented from being changed by the third party.

In S64, as the value of the count associated with the target URL, the CPU 132 stores 1 instead of 0 in the device table 142.

In S66, the CPU 132 stores the target GIP in the device table 142 in association with the target URL.

In S68, the CPU 132 sends the setting change screen data to the target terminal. The setting change screen data is data representing a screen which indicates the value of the WL flag associated with the target URL and the WL (see the device table 142 of FIG. 2). As a result, the setting change screen including the value of the WL flag and the WL is displayed on the target terminal. When the process of S68 is completed, the CPU 132 returns to the monitoring such as in S50.

As above, the APP server 100 sends the setting change screen data which represents the setting change screen including the current value of the WL flag and the current WL to the target terminal in the case of receiving the screen request from the target terminal. As a result, the user can acknowledge the current value of the WL flag and the current WL by checking the setting change screen.

In S70, the CPU 132 determines whether or not the GIP is stored in the device table 142 in association with the target URL. The CPU 132 determines YES in S70 in a case of determining that the GIP is stored, and proceeds to S72. On the other hand, the CPU 132 determines NO in S70 in a case of determining that the GIP is not stored, and returns to the monitoring such as in S50 without executing the process of S72.

In S72, the CPU 132 determines whether or not the target GIP matches the GIP associated with the target URL. The CPU 132 determines YES in S72 in a case of determining that the GIPs match, and returns to the monitoring such as in S50 without executing the process of S74. On the other hand, the CPU 132 determines NO in S72 in a case of determining that the GIPs do not match, and proceeds to S74.

In S74, the CPU 132 sends the notification information by email with the notification recipient address associated with the target URL (see the device table 142 of FIG. 2) as its recipient. When the process of S74 is completed, the CPU 132 returns to the monitoring such as in S50.

As above, the notification information is sent when the GIPs do not match, that is, in the case where the GIP of the sender of the first screen request does not match the GIP of the sender of the second or subsequent screen request. In other words, the notification information is sent if there is a high possibility that the second or subsequent screen request was sent from a terminal of a third party. Due to this, the administrator of the printer 200 can acknowledge that the screen request was received from an improper terminal.

The CPU 132 determines YES in S80 in a case of receiving a change request for the email print setting from a terminal (such as 300) via the network I/F 116 and proceeds to S82. The change request is a signal that requests change of the email print setting stored in the APP server 100, and includes the URL that was already sent in S54.

In S82, the CPU 132 changes the email print setting (i.e., the WL flag and the WL; see the device table 142 of FIG. 2) associated with the URL included in the change request received in S80. When the process of S82 is completed, the CPU 132 returns to the monitoring such as in S50.

Figure 6:
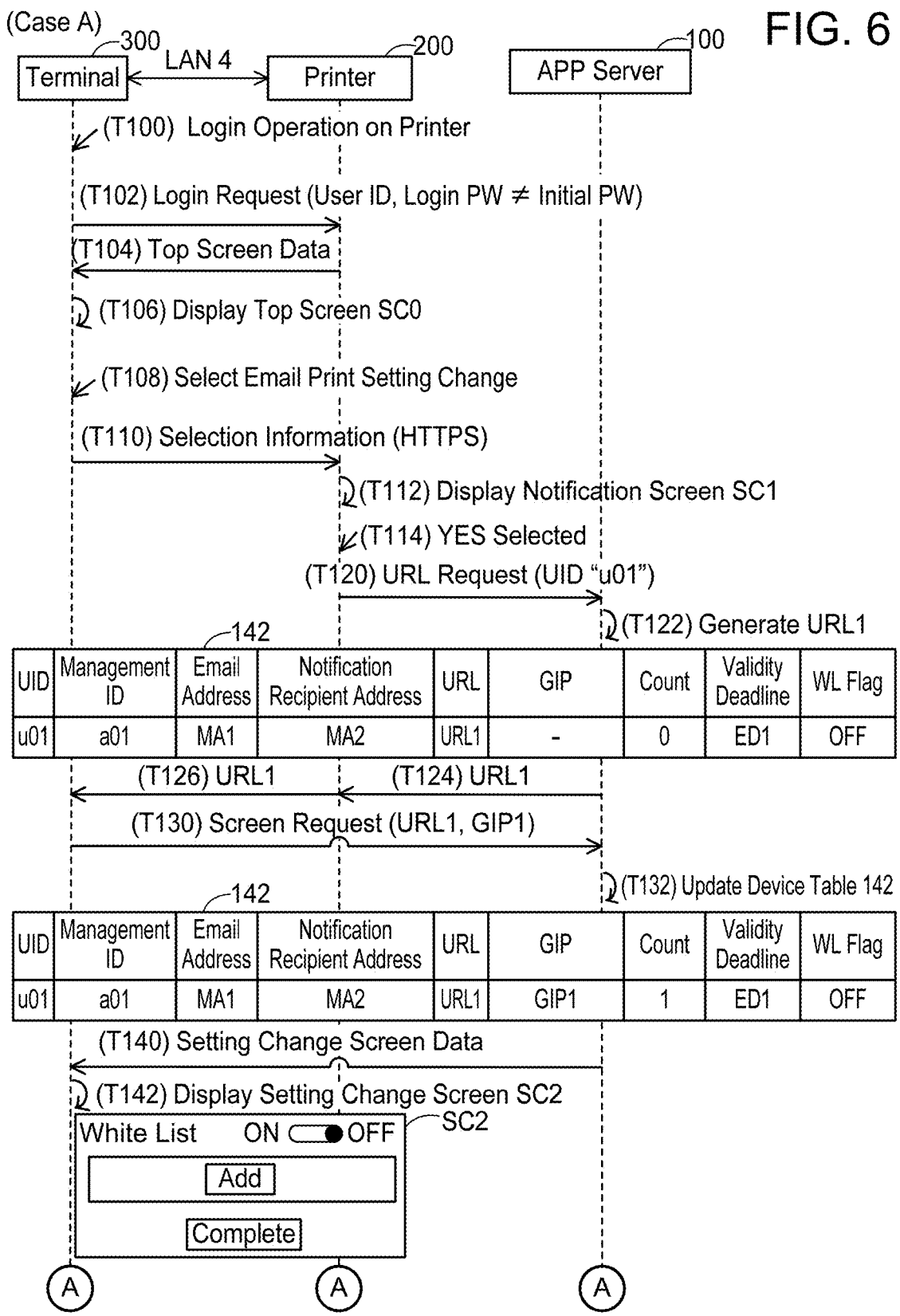
FIG. 6 is a sequence diagram of Case A in which selection information according to HTTPS is communicated via a LAN.
Figure 7:
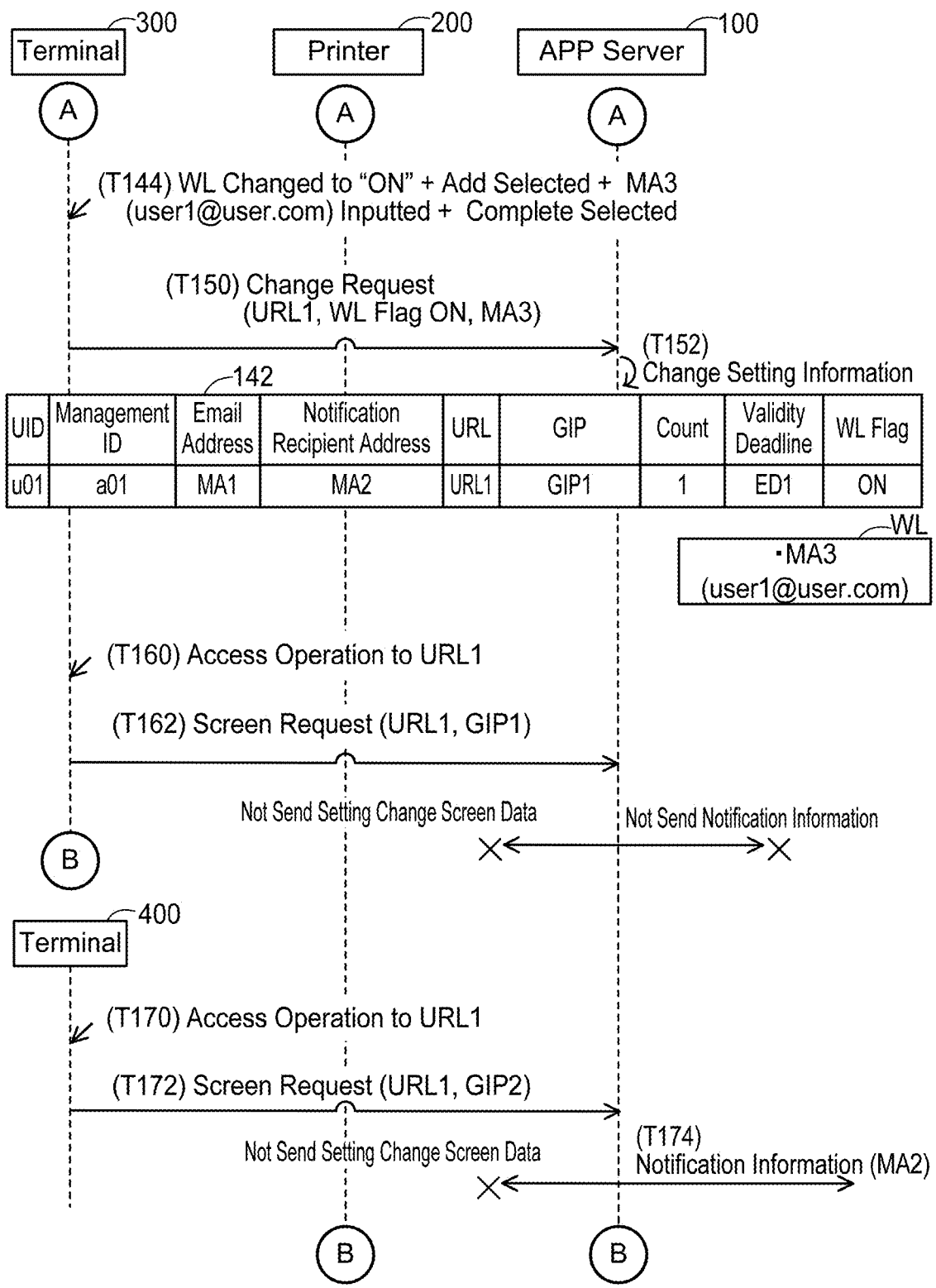
FIG. 7 is a continuation of FIG. 6.
Figure 8:
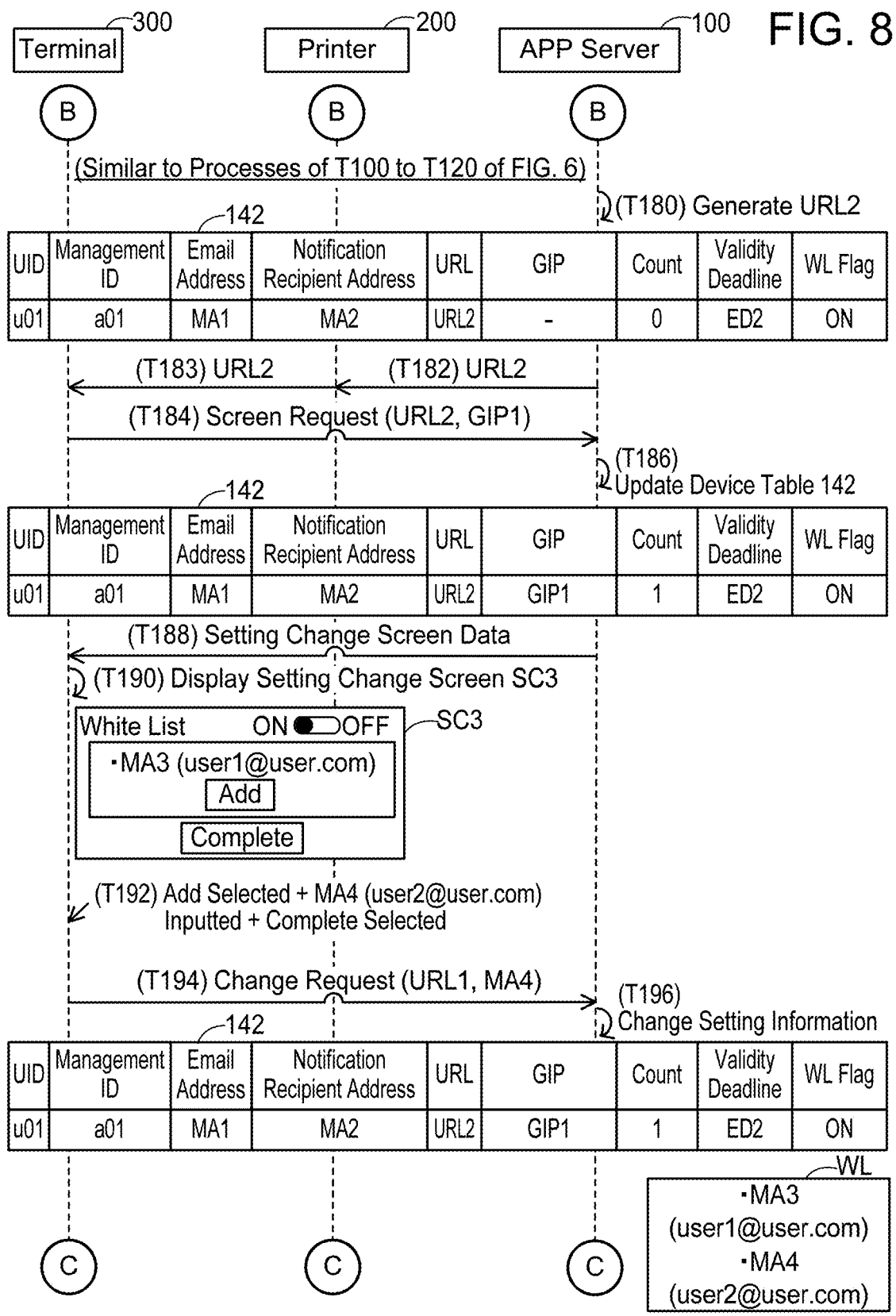
FIG. 8 is a continuation of FIG. 7.

(Case A; FIGS. 6 to 8)

Next, specific cases realized by the processes of FIGS. 4 and 5 will be described. Firstly, Case A in which the selection information is received according to the HTTPS by the printer 200 via the LAN I/F 214 will be described with reference to FIGS. 6 to 8. As shown in FIG. 6, the printer 200 and the terminal 300 are connected to the LAN 4.

In T100, the terminal 300 accepts a login operation into the printer 200 from the user. The login operation is an operation for logging into the web server in the printer 200, and includes an input operation of a user ID and a login PW. This login PW is not the initial PW but a PW designated by the user. In response to accepting the login operation, the terminal 300 sends a login request including the user ID and the login PW to the printer 200 according to the HTTPS via the LAN I/F 214 in T102.

In response to receiving the login request from the terminal 300 in T102 (YES in S2 of FIG. 4), the printer 200 executes authentication of the user ID and the login PW included in the login request. In the present case, since the authentication of the user ID and the login PW succeeds (YES in S4), the printer 200 sends the top screen data to the terminal 300 according to the HTTPS via the LAN I/F 214 in T104 (S10).

In response to receiving the top screen data from the printer 200 in T104, the terminal 300 displays the top screen SC0 represented by the top screen data in T106. In response to accepting selection of the email print setting change button in the top screen SC0 from the user in T108, the terminal 300 sends to the printer 200 the selection information indicating that this button was selected, according to the HTTPS via the LAN I/F 214 in T110.

In response to receiving the selection information from the terminal 300 in T110 (YES in S12), the printer 200 determines that the login PW is not the initial PW (NO in S14), and displays the notification screen SC1 in T112 (S16). After this, in response to accepting selection of the YES button in the notification screen SC1 from the user in T114 (YES in S18), the printer 200 sends a URL request including the UID "u01" of the printer 200 to the APP server 100 in T120 (S20).

In response to receiving the URL request from the printer 200 in T120 (YES in S50 of FIG. 5), the APP server 100 generates a URL1 and updates the device table 142 in T122 (S52). Specifically, the APP server 100 stores the URL1, a value "0" as the count, and a validity deadline ED1 in association with the UID "u01". Then, the APP server 100 sends the URL1 to the printer 200 in T124 (S54).

In response to receiving the URL1 from the APP server 100 in T124 (YES in S22 of FIG. 4), the printer 200 sends the URL1 to the terminal 300 according to the HTTPS via the LAN I/F 214 in T126 (NO in S24, YES in S26, S28).

In response to receiving the URL1 from the printer 200 in T126, the terminal 300 sends a screen request to the APP server 100 in T130. The screen request includes the URL1 received in T126 and a GIP1 being the GIP of the terminal 300.

In response to receiving the screen request from the terminal 300 in T130 (YES in S60 of FIG. 5), the APP server 100 refers to the device table 142 and checks the count and the validity deadline associated with the URL1 included in the screen request (S62). In the present case, the value of the count is 0 and the current time is before the validity deadline (YES in S62), thus the APP server 100 updates the device table 142 in T132 (S64, S66). Specifically, the APP server 100 stores the GIP1 and "1" as the value of the count in association with the URL1. After this, in T140, the APP server 100 sends setting change screen data representing a setting change screen SC2 to the terminal 300 (S68).

In response to receiving the setting change screen data from the APP server 100 in T140, the terminal 300 displays in T142 the setting change screen SC2 represented by the setting change screen data. The setting change screen SC2 includes a switch for switching ON and OFF of the WL flag, an address input box to which an email address to be registered to the WL is inputted, and a complete button. At present, the WL flag stored in the device table 142 is OFF and no email address is registered in the WL. As such, in the setting change screen SC2, the switch indicates OFF and no email address is shown in the address input box.

(Continuation of FIG. 6; FIG. 7)

In T144 of FIG. 7, the terminal 300 accepts an operation for changing the WL flag to ON and an operation for registering an email address MA3 in the WL from the user. The latter operation includes an operation of selecting an add button in the address input box in the setting change screen SC2, an operation of inputting the email address MA3, and an operation of selecting the complete button. As a result, the terminal 300 sends a change request to the APP server 100 in T150. This change request includes the URL1, information indicating that the WL flag is to be changed to ON, and the email address MA3.

The APP server 100 receives the change request from the terminal 300 in T150 (YES in S80 of FIG. 5). As a result, the APP server 100 changes the email print setting in the device table 142 in T152 (S82). Specifically, the APP server 100 stores the WL flag "ON" in association with the URL1. Further, the APP server 100 registers the email address MA3 in the WL corresponding to the URL1.

After this, in T160, the terminal 300 accepts an access operation to the URL1 from the user. As a result, the terminal 300 resends the screen request including the URL1 and the GIP1 to the APP server 100 in T162.

In response to receiving the screen request from the terminal 300 in T162 (YES in S60 of FIG. 5), the APP server 100 refers to the device table 142 and checks the count and the validity deadline associated with the URL1 included in the screen request (S62). In the present case, the value of the count is 1 (see T132 of FIG. 6). As such, the APP server 100 does not send the setting change screen data (NO in S62). Further, the GIP1 included in the screen request matches the GIP1 associated with the URL1. As such, the APP server 100 does not send the notification information (YES in S70, YES in S72).

After this, in T170, the terminal 400 accepts an access operation to the URL1 from a user of a terminal 400. As a result, the terminal 400 sends a screen request to the APP server 100 in T172. This screen request includes the URL1 and a GIP2 being the GIP of the terminal 400.

In response to receiving the screen request from the terminal 400 in T172 (YES in S60 of FIG. 5), the APP server 100 refers to the device table 142 and checks the count and the validity deadline associated with the URL1 included in the screen request (S62). In the present case, the value of the count is 1 (see T132 of FIG. 6). As such, the APP server 100 does not send the setting change screen data (NO in S62). Further, the GIP2 included in the screen request does not match the GIP1 associated with the URL1. Thus, in T174, the APP server 100 sends the notification information with the notification recipient address MA2 as the recipient (YES in S70, NO in S72, S74).

(Continuation of FIG. 7; FIG. 8)

After the above, as shown in FIG. 8, processes similar to T100 to T120 of FIG. 6 are executed. As a result, the APP server 100 generates a URL2 different from the URL1 and updates the device table 142 in T180 (S52 of FIG. 5). Specifically, the APP server 100 stores the URL2, the value "0" as the count, and a validity deadline ED2 in association with the UID "u01". Processes of T182 and T183 are similar to the processes of T124 and T126 of FIG. 6 except that the URL2 different from the URL1 is communicated. Further, a process of T184 is similar to the process of T130 of FIG. 6 except that the screen request includes the URL2.

In response to receiving the screen request from the terminal 300 in T184 (YES in S60), the APP server 100 refers to the device table 142 and checks the count and the validity deadline associated with the URL2 included in the screen request (S62). In the present case, the value of the count is 0 and the current time is before the validity deadline (YES in S62), thus the APP server 100 updates the device table 142 in T186 (S64, S66). Specifically, the APP server 100 stores the GIP1 and "1" as the value of the count in association with the URL2. A process of T188 is similar to the process of T140 of FIG. 6 except that setting change screen data representing a setting change screen SC3 different from the setting change screen SC2 is communicated.

A process of T190 is similar to the process of T142 of FIG. 6 except that the terminal 300 displays the setting change screen SC3. At present, the WL flag stored in the device table 142 indicates ON and the email address MA3 is registered in the WL. As such, in the setting change screen SC3, the switch for switching the WL flag indicates ON and MA3 is shown in the address input box. In T192, the terminal 300 accepts an operation for registering an email address MA4 in the WL from the user. As a result, the terminal 300 sends a change request to the APP server 100 in T194. The change request includes the URL1 and the email address MA4.

In T194, the APP server 100 receives the change request from the terminal 300 (YES in S80 of FIG. 5). As a result, the APP server 100 changes the email print setting in the device table 142 in T196 (S82). Specifically, the APP server 100 registers the email address MA4 in the WL corresponding to the URL1.

By the processes of FIGS. 6 to 8 as above being executed, the user can change the WL flag from OFF to ON (T152 of FIG. 7) and register the email addresses MA3, MA4 in the WL in the email print setting corresponding to the printer 200 (T152 of FIG. 7, T196 of FIG. 8).

Figure 9:
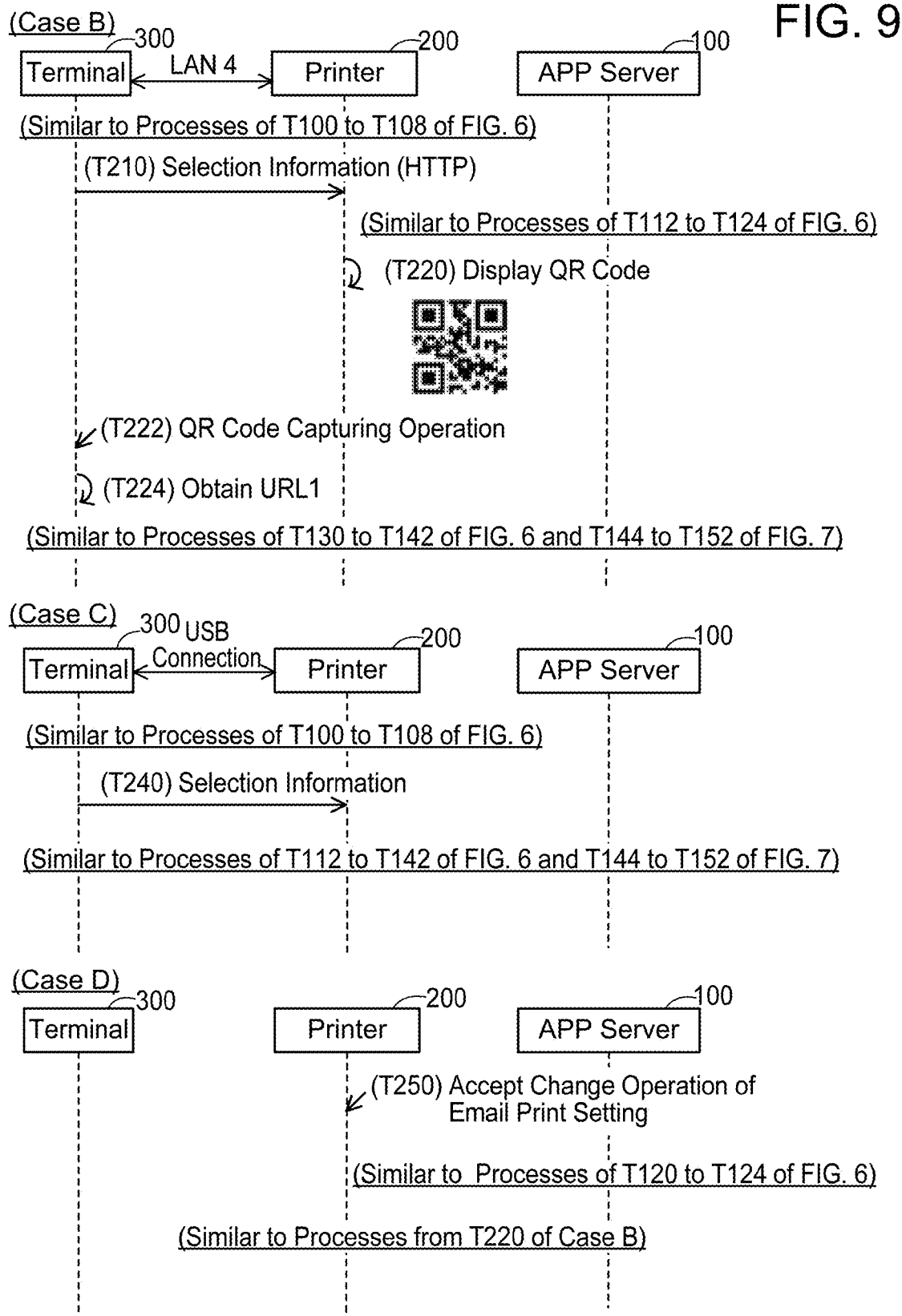
FIG. 9 is a sequence diagram of Case B in which selection information according to HTTP is communicated via the LAN, a sequence diagram of Case C in which selection information is communicated via a USB cable, and a sequence diagram of Case D in which the printer accepts a change operation.

(Case B; FIG. 9)

Next, Case B in which selection information is received by the printer 200 according to the HTTP via the LAN I/F 214 will be described with reference to FIG. 9. The printer 200 and the terminal 300 are connected to the LAN 4. In Case B, processes similar to T100 to T108 of FIG. 6 are executed except that communication according to the HTTP is executed instead of communication according to the HTTPS. As a result, the terminal 300 sends selection information to the printer 200 according to the HTTP via the LAN I/F 214 in T210.

In response to receiving the selection information from the terminal 300 in T210 (YES in S12 of FIG. 4), the printer 200 executes processes similar to T112 to T124 of FIG. 6. Then, in T220, the printer 200 displays a QR Code in which the URL1 is coded (NO in S24, NO in S26, S40).

In T222, the user uses the terminal 300 to perform an operation of capturing the QR Code displayed on the printer 200. Specifically, after having approached the printer 200, the user captures an image of the QR Code using a camera of the terminal 300. As a result, in T224, the terminal 300 decodes the QR Code to obtain the URL1. Subsequent processes are similar to the processes of T130 to T142 of FIG. 6 and T144 to T152 of FIG. 7. In this case as well, the user can change the WL flag from OFF to ON and register the email address MA3 in the WL in the email print setting corresponding to the printer 200 (T152 of FIG. 7).

(Case C; FIG. 9)

Next, Case C in which selection information is received by the printer 200 via the USB cable will be described. The printer 200 and the terminal 300 are connected to each other via the USB cable. Firstly, processes similar to T100 to T108 of FIG. 6 are executed. As a result, the terminal 300 sends selection information to the printer 200 via the USB cable in T240 (YES in S24, S28 of FIG. 4). Subsequent processes are similar to the processes of T112 to T142 of FIG. 6 and T144 to T152 of FIG. 7. In this case as well, the user can change the WL flag from OFF to ON and register the email address MA3 in the WL in the email print setting corresponding to the printer 200 (T152 of FIG. 7).

(Case D; FIG. 9)

Next, Case D in which the printer 200 accepts the change operation will be described. In Case D, the terminal 300 is not connected to the LAN 4. That is, the printer 200 and the terminal 300 cannot communicate with each other. In T250, the printer 200 accepts the change operation for the email print setting from the user (YES in S30 of FIG. 4). As a result, processes similar to T120 to T124 of FIG. 6 are executed. Subsequent processes are similar to the processes from T220 of Case B of FIG. 9 (S32, S34, S40, etc.). In this case as well, the user can change the WL flag from OFF to ON and register the email address MA3 in the WL in the email print setting corresponding to the printer 200.

Figure 10:
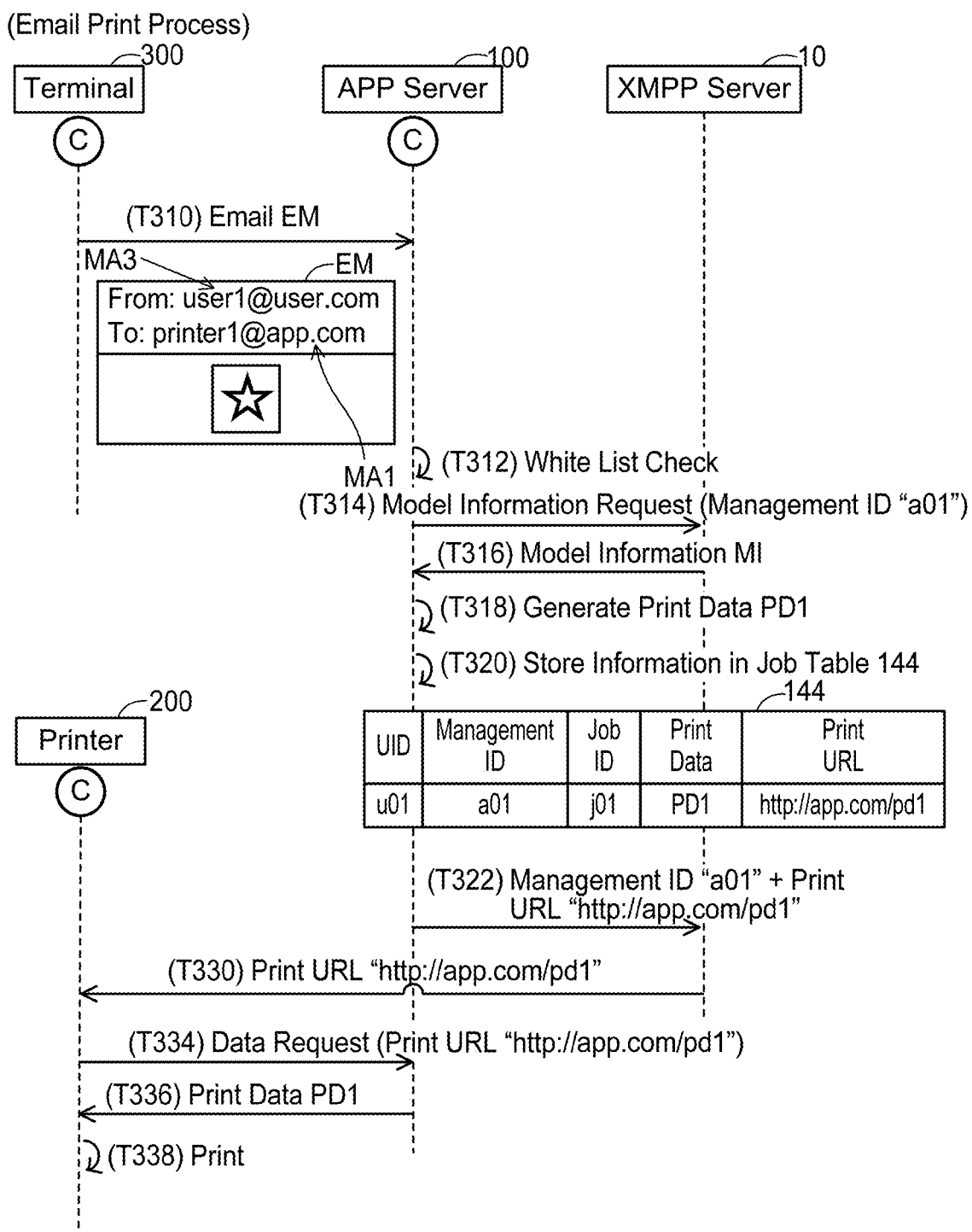
FIG. 10 is a sequence diagram of an email print process.

(Email Print Process; FIG. 10)

Next, a process for executing the email print will be described with reference to FIG. 10. In T310, the terminal 300 sends to the APP server 100 an email EM including the email address MA1 as its recipient address and the email address MA3 as its sender address. Image data corresponding to a print target image is attached to the email EM.

When receiving the email EM from the terminal 300 in T310, the APP server 100 identifies from the device table 142 the UID "u01", the management ID "a01", and the WL that are stored in association with the email address MA1 included in the email EM. Then, in T312, the APP server 100 checks whether or not the email address MA3 included as the sender address in the email EM is registered in the identified WL. In the present case, the email address MA3 is registered in the WL (see T152 of FIG. 7), thus processes from T314 are executed. The processes from T314 are not executed in a case where the email address MA3 is not registered in the WL. In T314, the APP server 100 sends to the XMPP server 10 a model information request that requests model information. The model information request includes the identified management ID "a01".

When receiving the model information request from the APP server 100 in T314, the XMPP server 10 sends, in T316, to the APP server 100 the model information MI (see the management table 42 of FIG. 2) stored in association with the management ID "a01" in the model information request.

When receiving the model information MI from the XMPP server 10 in T316, the APP server 100 uses the model information MI to convert the image data included in the email EM and generate print data PD1 having a data format which the printer 200 can interpret in T318. Then, in T320, the APP server 100 stores information related to a print job in the job table 144. Specifically, the APP server 100 stores the management ID "a01", a new job ID 101", the print data PD1, and a print URL "http://app.com/pd1" in association with the identified UID "u01". Here, the print URL indicates a location where the print data PD1 is stored within the APP server 100. A character string "pd1" in the print URL is a file name of the print data PD1. Then, in T322, the APP server 100 sends the management ID "a01" and the print URL "http://app.com/pd1" to the XMPP server 10.

When receiving the management ID "a01" and the print URL from the APP server 100 in T322, the XMPP server 10 sends the print URL to the printer 200 in T330 using the XMPP session corresponding to the management ID "a01" (see T70 of FIG. 3).

When receiving the print URL from the XMPP server 10 in T330, the printer 200 sends to the APP server 100 a data request that requests the print data in T334. The data request includes the print URL "http://app.com/pd1".

When receiving the data request from the printer 200 in T334, the APP server 100 obtains the print data PD1 indicated by the print URL "http://app.com/pd1" included in the data request. Then, in T336, the APP server 100 sends the print data PD1 to the printer 200.

When receiving the print data PD1 from the APP server 100 in T336, the printer 200 executes printing of the image corresponding to the print data PD1 in T338.

(Effects of Present Embodiment)

According to the present embodiment, the APP server 100 can send the URL1 indicating the location corresponding to the setting change screen SC2 to the printer 200 (T124 of FIG. 6), as a result of which the URL1 is outputted by the printer 200 (T126). After this, the APP server 100 sends the setting change screen data representing the setting change screen SC2 to the terminal 300 (T140) in the case of receiving the screen request including the URL1 from the terminal 300 that had obtained the URL1 (T130). Further, in the case of receiving the change request from the terminal 300 (T150 of FIG. 7), the APP server 100 changes the email print setting according to the change request (T152). As such, the user can change the email print setting stored in the APP server 100 by using the setting change screen SC2.

Further, according to the present embodiment, in the case of receiving the selection information from the terminal 300 (T110 of FIG. 6), the printer 200 sends to the APP server 100 the URL request that requests sending of the URL (T120) and receive the URL1 from the APP server 100 (T124). Then, the printer 200 executes the output process for externally outputting the URL1 (T126, T220 of FIG. 9). As a result, the terminal 300 can obtain the URL1 (T126 of FIG. 6, T224 of FIG. 9). In this case, the terminal 300 can display the setting change screen SC2 by using the URL1 (T142, T190 of FIG. 8). Due to this, the user can change the email print setting stored in the APP server 100 by using the setting change screen SC2.

(Corresponding Relationships)

The APP server 100, the printer 200, the terminal 300, and the terminal 400 are respectively examples of "server", "function executing device", "external device (and "first terminal device")", and "second terminal device". The terminal of the administrator of the printer 200 (i.e., the terminal in which the notification recipient address MA2 is set) is an example of "target device". The print function and the print engine 220 are respectively examples of "function" and "function executing engine". The email print setting is an example of "setting information". The URL1 and the URL2 are examples of "location information". The GIP1 and the GIP2 are respectively examples of "first identification information" and "second identification information". The WL flag and the WL are examples of "setting information related to a function". The count and the validity deadline are respectively examples of "number related information" and "date-and-time related information". The value "1" of the count is an example of "predetermined value". The notification screen SC1 and the setting change screen SC2 are respectively examples of "notification screen" and "setting change screen". The operation of the YES button in the notification screen SC1 is an example of "predetermined operation". The selection information received in S12 of FIG. 4 and the change operation accepted in S30 are examples of "reception instruction". The QR Code displayed in S40 is an example of "coded image". The initial PW is an example of "initial authentication information".

The process of S50 and the process of S54 of FIG. 5 are respectively examples of "receive a location information request" and "send the location information". The process of S52 is an example of "generate unique location information", "store, in the memory, the generated location information in association with number related information", and "store, in the memory, the generated location information in association with date-and-time related information". The process of S60 is an example of "receive a first screen request" and "receive a second screen request". The process of S62 is an example of "determine whether the number of reception is identical to a predetermined value" and "determine whether the location information included in the first screen request is valid". The process of S66 and the process of S68 are respectively examples of "store, in the memory, the location information included in the first screen request and the first identification information included in the first screen request in association with each other" and "send screen data". The process of S72 and the process of S74 are respectively examples of "determine whether the first identification information stored in association with the location information included in the second screen request is identical to the second identification information included in the second screen request" and "send notification information". The process of S80 and the process of S82 are respectively examples of "receive a change request" and "change the setting information". The process of T310 of FIG. 10 is an example of "receive a function executing request". The processes of T312 to T322 are examples of "execute a relation process".

The process of S2 of FIG. 4 is an example of "receive a login request". The process of S12 and the process of S30 are examples of "accept a reception instruction". The process of S14 and the process of S16 are respectively examples of "determine whether the authentication information included in the login request is identical to predetermined initial authentication information" and "cause the display unit to display a notification screen". The process of S20 and the process of S22 are respectively examples of "send a location information request" and "receive the location information". The process of S28 and the process of S40 are examples of "execute an output process". The process of T330 and the process of T338 of FIG. 10 are respectively examples of "receive a function executing instruction" and "cause the function executing engine to execute the function".

(Variant 1) The "function executing device" is not limited to the printer 200, and may, for example, be a scanner, a multi-function device, a facsimile device, a PC, a server, or the like. For example, in an example where the function executing device is a scanner, a scan function is an example of "function".

(Variant 2) The "setting information" may, for example, be a black list, an email address used for the email print, information indicating whether to notify a print status, a timing of notifying the print status, or the like. Further, the "setting information" may not be the information related to the email print, but may, for example, be information on a print resolution, the number of print colors, a paper size, or the like. Further, the "setting information" may not be the information related to the print function, but may, for example, be information related to a scan function (such as a scan resolution or the number of scan colors), or may be information (such as a display resolution) related to another function (such as a display function).

(Variant 3) The APP server 100 may not generate a URL in S52 each time it is determined YES in S50 of FIG. 5, but may send to the printer 200 the same preset URL. In general terms, "send the location information" may not include sending different location information to the function executing device each time the location information request is received from the function executing device.

(Variant 4) The APP server 100 may store a plurality of URLs in advance, select one URL from the plurality of URLs in S52 of FIG. 5 without generating a URL, and send the selected URL to the printer 200 in S54. In this variant, "generate unique location information" may be omitted.

(Variant 5) The APP server 100 may determine YES in S62 of FIG. 5 in a case where the value of the count associated with the target URL is less than 2, while it may determine NO in a case where the value of the count is 2. In this variant, "2" is the "predetermined value". In another variant, the "predetermined value" may be an integer of "3" or more. In another variant, the APP server 100 may store "1" as the value of the count in S52. In this case, the APP server 100 may decrement the value of the count to 0 in S64. The APP server 100 may determine YES in S62 in a case where the value of the count associated with the target URL is 1, while it determines NO in S62 in a case where the value of the count is 0. In this variant, the count as above is an example of "number related information" and "0" is the "predetermined value". In another variant, the APP server 100 may store an access flag "OFF" instead of the count in S52. In this case, the APP server 100 may change the access flag from "OFF" to "ON" in S64, and may determine YES in S62 in a case where the access flag is "OFF", while it determines NO in S62 in a case where the access flag is "ON". In this variant, the access flag is an example of "number related information" and "ON" is an example of "predetermined value".

(Variant 6) The APP server 100 may not store the count in the device table 142 in S52 of FIG. 5. In this case, the APP server 100 does not execute the determination using the count in S62 nor the process of S64. In this variant, "store, in the memory, the generated location information in association with number related information" and "determine whether the number of reception is identical to a predetermined value" may be omitted.

(Variant 7) The validity deadline stored in S52 of FIG. 5 may not be the date and time indicating an expiration date and time of the validity period of the URL, but may, for example, be a combination of the date and time when the URL was generated and the validity period, may be a timer that counts down time until the validity deadline of the URL, or may be a timer that counts up from the date and time when the URL was generated. In this variant, these types of information are examples of "date-and-time related information".

(Variant 8) The APP server 100 may not store the validity deadline in the device table 142 in S52 of FIG. 5. In this case, the APP server 100 does not execute the determination using the validity deadline in S62. In this variant, "store, in the memory, the generated location information in association with date-and-time related information" and "determine whether the location information included in the first screen request is valid" may be omitted.

(Variant 9) In the case of determining NO in S62 of FIG. 5, the APP server 100 may return to the monitoring such as in S50 without executing the processes of S70 to S74. In this case, the APP server 100 does not execute the process of S66 in the case of determining YES in S62. In this variant, "store, in the memory, the location information included in the first screen request and the first identification information included in the first screen request in association with each other", "determine whether the first identification information stored in association with the location information included in the second screen request is identical to the second identification information included in the second screen request", and "send notification information" may be omitted.

(Variant 10) The setting change screen data sent in S68 of FIG. 5 may not include the value of the current WL flag or the current WL associated with the target URL. As such, for example, the setting change screen SC3 displayed in T190 of FIG. 8 may not include the current value of the WL flag, or further, MA3 may not be shown in the address input box. In general terms, the screen data representing the setting change screen that includes the setting value indicated by the setting information in the memory may not be sent to the first terminal device.

(Variant 11) The process of the printer 200 outputting the URL is not limited to the sending of the URL in S28 or the displaying of the QR Code in S40 of FIG. 4, but may, for example, be supply of the URL to a Near Field Communication (NFC) I/F. In this case, the NFC I/F stores the URL, thus the printer 200 can send the URL to the terminal 300 in response to the terminal 300 being brought closer to the printer 200. In this variant, the supply of the URL to the NFC I/F is an example of "output process". In another variant, the printer 200 may send the URL to the terminal 300 via a Bluetooth (registered trademark, BT) I/F. In this variant, sending of the URL via the BT I/F is an example of "output process". In another variant, the printer 200 may print the QR Code, or may display the URL itself on the display unit 212. In these variants, these processes are examples of a process executed in "output process".

(Variant 12) The printer 200 may skip the processes of S16 and S18 of FIG. 4 and execute S20. In this variant, "cause the display unit to display a notification screen" may be omitted.

(Variant 13) The printer 200 may execute the processes of S20 and S22 of FIG. 4 after the process of S14 and before the process of S16. In this case, the printer 200 proceeds to S24 in the case of determining YES in S18. In this variant, the received URL not being outputted in the case of NO in S18 is an example of "in a case where the predetermined operation is not performed on the function executing device after the notification screen has been displayed, the output process is not executed".

(Variant 14) The printer 200 may execute the process of S28 in both cases of receiving the selection information according to the HTTPS via the LAN I/F 214 and receiving the selection information according to the HTTP via the LAN I/F 214 in S12 of FIG. 4. In this variant, the process of S26 may be omitted. In general terms, in regard to "execute an output process", the output process of sending the location information to the terminal device may be executed in both cases of receiving the reception instruction according to the HTTPS and receiving the reception instruction according to the HTTP from the terminal device.

(Variant 15) In the case of receiving the selection information according to the HTTP via the LAN I/F 214 in S12 of FIG. 4, the printer 200 may terminate the process of FIG. 4 without executing the processes from S14. In this variant, the processes from S14 not being executed is an example of "in a case where the reception instruction is accepted by receiving the reception instruction according to Hyper Text Transfer Protocol (HTTP) from the terminal device via the LAN interface, the output process for sending the location information to the terminal device via the LAN interface is not executed". In another variant, in the case of NO in S26, the printer 200 may terminate the process of FIG. 4 by skipping the process of S40. In this variant, the received URL not being outputted in the case of NO in S26 is an example of "the output process for sending the location information to the terminal device via the LAN interface is not executed". In another variant, instead of the process of S40, the printer 200 may execute the supply of the URL to the NFC I/F, the sending of the URL via the BT I/F, the printing of the QR Code, or the displaying of the URL itself. In this variant, these processes are examples of "the output process for sending the location information to the terminal device via the LAN interface is not executed".

(Variant 16) The printer 200 may not be provided with the USB I/F 216. In this variant, the process of S24 of FIG. 4 may be omitted.

(Variant 17) In the case of accepting the change operation for the email print setting from the user in S30 of FIG. 4, the printer 200 may execute the supply of the URL to the NFC I/F, the sending of the URL via the BT I/F, the printing of the QR Code, or the displaying of the URL itself. In this variant, these processes are examples of "output process".

(Variant 18) The process of S14 of FIG. 4 may be omitted. In this variant, "determine whether the authentication information included in the login request is identical to predetermined initial authentication information" may be omitted.

(Variant 19) The printer 200 may execute the processes of S20 and S22 in FIG. 4 after the process of S12 and before the process of S14. In this case, the printer 200 proceeds to S24 in the case of determining YES in S18. In this variant, the received URL not being outputted in the case of YES in S14 is an example of "the output process is not executed in a case where the reception instruction is accepted by receiving the reception instruction from the terminal device via the LAN interface after authentication of the authentication information has succeeded and it is determined that the authentication information is identical to the initial authentication information".

(Variant 20) The processes of S2 to S28 of FIG. 4 may be omitted. In this variant, "receive a login request" may be omitted. In another variant, the processes of S30 to S34 may be omitted.

(Variant 21) The notification recipient address registered in the device table 142 may not be the email address of the administrator, but may be a sender email address of an email that had requested the email print in the past. For example, in the case of receiving the email EM from the terminal 300 in T310 of FIG. 10, the APP server 100 registers the notification recipient address in the device table 142. Specifically, the APP server 100 may register the email address MA3 which is the sender email address as the notification recipient address in association with the email address MA1 which is the recipient email address. In case of this variant, the registration request in T10 of FIG. 3 may not include the notification recipient address MA2 which is the administrator email address. Further, in a case where the email print has been executed multiple times in the same printer, the notification recipient address may be a sender email address of email that had requested the email print the most in the past, or may be a sender email address of email that had most recently requested the email print.

(Variant 22) In the embodiments as above, the respective processes of FIGS. 3 to 10 are realized by software (such as the programs 40, 140, 240), however, at least one of these processes may be realized by hardware such as a logic circuit.

What is claimed is:

1. A server comprising:
a memory configured to store setting information related to a function that a function executing device is configured to execute; and
a controller,
wherein the controller is configured to:
receive a function executing request from an external device, the function executing request being for causing the function executing device to execute the function;
in a case where the function executing request is received from the external device, execute a relation process using the setting information in the memory, the relation process being related to causing the function executing device to execute the function;
receive a location information request for requesting sending of location information from the function executing device, the location information indicating a location corresponding to a setting change screen for changing the setting information;
in a case where the location information request is received from the function executing device, send the location information to the function executing device, wherein the location information is outputted by the function executing device in response to the location information being sent to the function executing device;
receive a first screen request including the location information from a first terminal device that has obtained the location information outputted by the function executing device;
in a case where the first screen request is received from the first terminal device, send screen data representing the setting change screen to the first terminal device, wherein the setting change screen is displayed on the first terminal device in response to the screen data being sent to the first terminal device;
in a case where an instruction for changing the setting information is given on the setting change screen, receive a change request for requesting a change of the setting information from the first terminal device; and
in a case where the change request is received from the first terminal device, change the setting information in the memory according to the change request.

2. The server as in claim 1, wherein
each time the location information request is received from the function executing device, the controller is configured to send different location information to the function executing device.

3. The server as in claim 2, wherein
the controller is further configured to, each time the location information request is received from the function executing device, generate unique location information, and each time the location information request is received from the function executing device, the controller is configured to send the location information generated in response to the location information request being received to the function executing device.

4. The server as in claim 3, wherein
the controller is further configured to:
each time the location information is generated, store, in the memory, the generated location information in association with number related information related to a number of reception of the first screen request including the generated location information; and
each time the first screen request is received from the first terminal device, determine whether the number of reception is identical to a predetermined value using the number related information stored in association with the location information included in the first screen request,
wherein in a case where the first screen request is received from the first terminal device and it is determined that the number of reception is not identical to the predetermined value, the controller is configured to send the screen data to the first terminal device, and
in a case where the first screen request is received from the first terminal device and it is determined that the number of reception is identical to the predetermined value, the screen data is not sent to the first terminal device.

5. The server as in claim 3, wherein
the controller is further configured to:
each time the location information is generated, store, in the memory, the generated location information in association with date-and-time related information related to a date and time when the location information was generated; and
each time the first screen request is received from the first terminal device, determine whether the location information included in the first screen request is valid using the date-and-time related information stored in association with the location information included in the first screen request,
wherein in a case where the first screen request is received from the first terminal device and it is determined that the location information is valid, the controller is configured to send the screen data to the first terminal device, and
in a case where the first screen request is received from the first terminal device and it is determined that the location information is not valid, the screen data is not sent to the first terminal device.

6. The server as in claim 1, wherein
the first screen request further includes first identification information for identifying the first terminal device, and
the controller is further configured to:
in the case where the first screen request is received from the first terminal device, store, in the memory, the location information included in the first screen request and the first identification information included in the first screen request in association with each other;
after the first screen request has been received from the first terminal device, receive a second screen request from a second terminal device, the second screen request including the location information and second identification information for identifying the second terminal device;

in a case where the second screen request is received from the second terminal device, determine whether the first identification information stored in association with the location information included in the second screen request is identical to the second identification information included in the second screen request; and in a case where it is determined that the first identification information is not identical to the second identification information, send notification information to a target device, the notification information being for notifying that the second screen request has been received from the second terminal device which is different from the first terminal device.

7. The server as in claim 1, wherein in the case where the first screen request is received from the first terminal device, the controller is configured to send the screen data to the first terminal device, the screen data representing the setting change screen including a setting value indicated by the setting information in the memory.

8. A function executing device comprising:

a function executing engine configured to execute a function; and a controller, wherein the controller is configured to:

receive a function executing instruction from a server;

in a case where the function executing instruction is received from the server, cause the function executing engine to execute the function;

accept a reception instruction for receiving location information, the location information being information indicating a location corresponding to a setting change screen for changing setting information related to the function, the setting information being stored in the server;

in a case where the reception instruction is accepted, send a location information request for requesting sending of the location information to the server;

in a case where the location information request is sent to the server, receive the location information from the server; and in a case where the location information is received from the server, execute an output process for externally outputting the location information.

9. The function executing device as in claim 8, further comprising:

a display unit; and a Local Area Network (LAN) interface configured to execute communication via a LAN, wherein the controller is further configured to, in a case where the reception instruction is accepted by receiving the reception instruction from a terminal device via the LAN interface, cause the display unit to display a notification screen for prompting to perform a predetermined operation to the function executing device, wherein in a case where the predetermined operation is performed on the function executing device after the notification screen has been displayed, the controller is configured to execute the output process, and in a case where the predetermined operation is not performed on the function executing device after the notification screen has been displayed, the output process is not executed.

10. The function executing device as in claim 8, further comprising a Local Area Network (LAN) interface configured to execute communication via a LAN, wherein in a case where the reception instruction is accepted by receiving the reception instruction according to Hyper Text Transfer Protocol Secure (HTTPS) from a terminal device via the LAN interface, the controller is configured to execute the output process for sending the location information to the terminal device via the LAN interface, and in a case where the reception instruction is accepted by receiving the reception instruction according to Hyper Text Transfer Protocol (HTTP) from the terminal device via the LAN interface, the output process for sending the location information to the terminal device via the LAN interface is not executed.

11. The function executing device as in claim 10, wherein in the case where the reception instruction is accepted by receiving the reception instruction according to the HTTP from the terminal device via the LAN interface, the controller is configured to execute the output process for outputting a coded image in which the location information is coded.

12. The function executing device as in claim 10, further comprising a Universal Serial Bus (USB) interface configured to execute communication via a USB cable, wherein in a case where the reception instruction is accepted by receiving the reception instruction according to the HTTPS from the terminal device via the USB interface, the controller is configured to execute the output process for sending the location information to the terminal device via the USB interface, and in a case where the reception instruction is accepted by receiving the reception instruction according to the HTTP from the terminal device via the USB interface, the controller is configured to execute the output process for sending the location information to the terminal device via the USB interface.

13. The function executing device as in claim 8, wherein in a case where the reception instruction that is an operation performed on the function executing device is accepted, the controller is configured to execute the output process for outputting a coded image in which the location information is coded.

14. The function executing device as in claim 8, further comprising a Local Area Network (LAN) interface configured to execute communication via a LAN, wherein the controller is further configured to:

receive a login request including authentication information from a terminal device via the LAN interface; and in a case where the login request is received from the terminal device, determine whether the authentication information included in the login request is identical to predetermined initial authentication information, wherein the controller is configured to execute the output process in a case where the reception instruction is accepted by receiving the reception instruction from the terminal device via the LAN interface after authentication of the authentication information has succeeded and it is determined that the authentication information is not identical to the initial authentication information, and the output process is not executed in a case where the reception instruction is accepted by receiving the reception instruction from the terminal device via the LAN interface after authentication of the authentication information has succeeded and it is determined that the authentication information is identical to the initial authentication information.

15. A non-transitory computer-readable recording medium storing computer readable instructions for a server, the server comprising:
a memory configured to store setting information related to a function that a function executing device is configured to execute; and
a processer,
wherein the computer readable instructions when executed by the processor, cause the server to:
receive a function executing request from an external device, the function executing request being for causing the function executing device to execute the function;
in a case where the function executing request is received from the external device, execute a relation process using the setting information in the memory, the relation process being related to causing the function executing device to execute the function;
receive a location information request for requesting sending of location information from the function executing device, the location information indicating a location corresponding to a setting change screen for changing the setting information;
in a case where the location information request is received from the function executing device, send the location information to the function executing device, wherein, the location information is outputted by the function executing device in response to the location information being sent to the function executing device;
receive a first screen request including the location information from a first terminal device which has obtained the location information outputted by the function executing device;
in a case where the first screen request is received from the first terminal device, send screen data representing the setting change screen to the first terminal device, wherein the setting change screen is displayed on the first terminal device in response to the screen data being sent to the first terminal device;
in a case where an instruction for changing the setting information is given on the setting change screen, receive a change request for requesting a change of the setting information from the first terminal device, and
in a case where the change request is received from the first terminal device, change the setting information in the memory according to the change request.

16. A non-transitory computer-readable recording medium storing computer readable instructions for a function executing device,
the function executing device comprising:
a function executing engine configured to execute a function; and
a processor,
wherein the computer readable instructions when executed by the processor, cause the function executing device to:
receive a function executing instruction from a server;
in a case where the function executing instruction is received from the server, cause the function executing engine to execute the function;
accept a reception instruction for receiving location information, the location information being information indicating a location corresponding to a setting change screen for changing setting information related to the function, the setting information being stored in the server;
in a case where the reception instruction is accepted, send a location information request for requesting sending of the location information to the server;
in a case where the location information request is sent to the server, receive the location information from the server; and
in a case where the location information is received from the server, execute an output process for externally outputting the location information.

* * * * *